(12) United States Patent
Hartmann et al.

(10) Patent No.: US 10,914,839 B2
(45) Date of Patent: Feb. 9, 2021

(54) OPTICAL ASSEMBLY AND A LIDAR DEVICE HAVING AN OPTICAL ASSEMBLY OF THIS TYPE

(71) Applicant: Robert Bosch GmbH, Stuttgart (DE)

(72) Inventors: Stefanie Hartmann, Tottenburg am Neckar (DE); Annette Frederiksen, Renningen (DE); Tobias Graf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/475,840

(22) PCT Filed: Jan. 15, 2018

(86) PCT No.: PCT/EP2018/050812
§ 371 (c)(1),
(2) Date: Jul. 3, 2019

(87) PCT Pub. No.: WO2018/137950
PCT Pub. Date: Aug. 2, 2018

(65) Prior Publication Data
US 2019/0346569 A1 Nov. 14, 2019

(30) Foreign Application Priority Data
Jan. 25, 2017 (DE) .................. 10 2017 201 127

(51) Int. Cl.
*G01S 17/42* (2006.01)
*G01S 7/481* (2006.01)
*G02B 5/18* (2006.01)

(52) U.S. Cl.
CPC ............ *G01S 17/42* (2013.01); *G01S 7/4816* (2013.01); *G01S 7/4817* (2013.01); *G02B 5/1814* (2013.01)

(58) Field of Classification Search
CPC ...... G01S 17/42; G01S 7/4816; G01S 7/4817; G02B 5/1814
See application file for complete search history.

(56) References Cited

U.S. PATENT DOCUMENTS 6,624,899 B1 * 9/2003 Clark .................... G01C 3/085
356/614

FOREIGN PATENT DOCUMENTS

| DE | 102012222421 A1 | 6/2014 | |
| DE | 102013215627 A1 | 2/2015 | |
| EP | 2963445 A2 | 1/2016 | |
| WO | WO-2015018836 A1 * | 2/2015 | ......... G02B 26/0808 |

OTHER PUBLICATIONS

International Search Report for PCT/EP2018/050812, dated Apr. 9, 2018.

* cited by examiner

*Primary Examiner* — Jamil Ahmed
(74) *Attorney, Agent, or Firm* — Norton Rose Fulbright US LLP; Gerard Messina

(57) ABSTRACT

An optical assembly, for receiving light waves, includes a receiving optical system for focusing at least one incoming light wave onto a surface of a detector for detecting the at least one light wave, at least one diffractive optical element with a planar extension being situated between the receiving optical system and the detector, and the at least one diffractive optical element including a surface with a surface structure with at least one optical function. Furthermore, a LIDAR device includes an optical assembly of this type.

15 Claims, 2 Drawing Sheets

OPTICAL ASSEMBLY AND A LIDAR DEVICE HAVING AN OPTICAL ASSEMBLY OF THIS TYPE

FIELD OF THE INVENTION

The present invention relates to an optical assembly for receiving light waves and a LIDAR device having an optical assembly of this type.

BACKGROUND INFORMATION

There are various concepts for LIDAR (Light Detection and Ranging) devices. The use of so-called "macro-scanners" is one possibility. In this case, a rotating macromirror, for example, has a diameter in a range of several centimeters. Thus, a light beam having a diameter in this range may be guided across the mirror. A larger beam diameter has particular advantages in maintaining eye safety, since a pupil diameter of 7 mm, assumed in the standard (IEC 60825-1) may only capture a fraction of the beam. In addition, a larger beam diameter is more robust against interruptions, like rain or dust. The use of "micro-scanners" is another possibility. In this case, small mirrors with a diameter in the range of several millimeters are used, which are manufactured in MEMS (micro-electro mechanical systems) technology and are mounted to be rotatable or pivotable in one or two axes in order to implement a beam deflection. The small overall dimensions and the lack of macroscopically moved elements are advantageous here. However, small mirror diameters disadvantageously have an effect on eye safety and are susceptible to failure. Furthermore, it is only possible with difficulty to operate systems based on these micro-mirrors, in such a way that the same optical path may be used for the transmitting and receiving path. The micromirror, depending on size, may in this case severely limit the receiving aperture, whereby not enough photons may be collected for an optimal illumination of a detector.

In present systems with complex receiving optics, a large surface detector must be used. This is necessary so that the signal-to-noise behavior of the detector is low such that objects at larger distances may also still be reliably detected. However, the size of the surface of the detector has a direct effect on the manufacturing costs of the device.

SUMMARY OF THE INVENTION

An underlying object of the present invention may be considered in creating an optical assembly and a LIDAR device having an optical assembly of this type which facilitates a use of a smaller detector surface.

This object may be achieved with the aid of the respective subject matter described herein. Advantageous embodiments of the present invention are the subject matter of the respective further descriptions herein.

According to one aspect of the present invention, an optical assembly for receiving light waves is provided, including a receiving optical system for focusing at least one incoming light wave onto a surface of a detector for detecting the at least one light wave, at least one diffractive optical element with a planar extension being situated between the receiving optical system and the detector, and the at least one diffractive optical element includes a surface with a surface structure with at least one optical function.

An assembly for receiving light waves may be created which includes a diffractive optical element. Due to this measure, an incident light wave may be deflected and bundled by diffraction onto a detector in such a way that the surface of the detector may be configured to be smaller with respect to an optical assembly which is merely made up of lens elements. The diffractive optical element here includes a grating constant or pixels with one pixel size. Each grating constant or each pixel bundles and directs the light of the entire incidence angle of the optical assembly by diffraction in at least one direction. The optical assembly may be used, for example, in a LIDAR device for receiving a reflected light wave. Additional application areas may be, for example, range finders and speedometers. An incoming light wave may hereby have an arbitrary wavelength in the visible or invisible spectrum. Possible wavelengths of the light wave may lie, for example in the use of laser beams, in the range from 150 nm to 500 µm. The diffractive optical element may be, for example, a diffraction grating, which may be configured as a transmission grating. Such a diffraction grating may hereby be a laminar grating or, for example, a wire grating with a grating constant or a pixel size, which is adapted to the wavelength of the light wave and the detector. The optical function of the diffractive optical element may, for example, be the bundling or focusing of the light wave by diffraction. Furthermore, a spreading of the light wave onto multiple areas of the detector or onto multiple detectors, a correction of imaging errors, or selective transmission based on the wavelength of the light wave or of the incidence angle of the light wave are also conceivable as possible optical functions.

According to one exemplary embodiment, the diffractive optical element of the optical assembly is configured as a hologram to deflect or focus a light wave. It should be mentioned that the diffractive optical element includes holograms in its application potentials. Holograms may thus be viewed as special applications of diffractive optical elements. A hologram or a holographic optical element may be manufactured in a technically simple and economical way. For example, photolithographic methods may be used for manufacturing the hologram. Alternatively, a holographic printer may manufacture the hologram. In this case, the printer may, for example, assign a different optical function to each pixel of the hologram.

In another exemplary embodiment, the diffractive optical element is configured as a volume hologram to deflect or focus a light wave. The diffractive optical element may have a particularly high diffraction efficiency. In particular, the volume hologram may be configured as a phase hologram. The volume hologram may have a constant or variable angle and/or wavelength selectivity. In this case, the volume element may suppress interfering light or parasitic reflections and may have additional filter functions. The degree of selectivity of the incidence angles and/or the wavelengths and/or the filter function may hereby be controlled by material parameters, for example, thickness and refractive index of the holographic layer or of the volume hologram.

According to another exemplary embodiment, the detector includes a plurality of detector cells, which are distributed uniformly or non-uniformly along the surface of the detector. The detector may be configured here as an array or a matrix including a plurality of sensors or detector cells, which allow an incident light wave to be detected location-dependently. The sensors may be, for example, CCD, CMOS, APD or SPAD sensors.

According to another exemplary embodiment, the receiving optical system focuses incoming light waves via at least one lens element onto the at least one diffractive optical element. In this way, the diffractive optical element may be illuminated according to the incidence angle, so that the efficiency of the assembly may be improved.

In one exemplary embodiment, the diffractive optical element has an even or uneven surface. The surface may have, for example, a surface structure. The diffractive optical element may be configured as a volume hologram with an even or uneven surface. As another possibility, the volume hologram may have at least one uneven surface due to a curved shape. The surface structure may be in the range of nano-, micro-, or millimeters. A diffraction behavior of the diffractive optical element may additionally be influenced by the use of an uneven surface with, for example, a convexity. In this way, the diffractive optical element may be adapted to different configurations. Alternatively, the diffractive optical element may also be provided with a surface structure on both sides. In this case, the respective surface may be configured to be selectively even or uneven.

According to one exemplary embodiment, the optical function varies along the surface of the diffractive optical element. Thus, for example, other grating constants or pixel sizes may be present on an edge of the surface of the diffractive optical element than in a central area of the surface. Thus, the light waves in the edge area may be influenced differently than in the central area of the surface of the diffractive optical element.

In another exemplary embodiment, the surface of the diffractive optical element includes at least two superimposed optical functions. In this way, the diffractive optical element may simultaneously have multiple optical functions. Filter functions, for example, may be implemented here in addition to the deflection and focusing. Consequently, imaging errors may also be corrected by the configuration of the diffractive optical element.

According to another exemplary embodiment, the diffractive optical element includes an optical function which is dependent on a wavelength of the at least one light wave. For example, the permeability of the diffractive optical element may be thereby adapted in such a way that only light waves having a defined wavelength may pass through the diffractive optical element. In addition, the optical function may be adapted in such a way that the light wave is deflected to different degrees or focused to different degrees depending on location. For example, a deflection of the light wave in an edge area of the diffractive optical element may be configured to be more strong, and more weak in a central area, for example, in an optical axis of the diffractive optical element. Furthermore, an additional filter effect may be achieved hereby.

In one exemplary embodiment, each detector cell is illuminated in each case by at least two pixels of the diffractive optical element. In this way, multiple hologram pixels may be focused in each case on a detector cell in applications with low demands on interference resistance, and accepting a poorer signal-to-noise behavior of the light waves. Each detector cell is hereby particularly strongly illuminated and may have a smaller configuration or may be read out more quickly. Alternatively, the detector itself may have a smaller configuration. The detector cells may remain the same or may be configured to be larger.

According to another aspect of the present invention, a LIDAR device for transmitting and receiving at least one light wave is provided including at least one rotatable or pivotable light wave source and including an optical assembly.

Due to the use of an optical assembly according to one aspect of the present invention in a LIDAR device for transmitting and receiving light waves, a diffractive optical element is used having at least one optical function. Due to this measure, an incident light wave may be deflected and bundled by diffraction onto a detector in such a way that the surface of the detector may be configured to be smaller with respect to an optical assembly which is merely made up of lens elements. Due to the use of smaller detectors and a reduction of lenses in the beam path of the optical assembly, the manufacturing costs of the LIDAR device may be reduced.

In one exemplary embodiment, the optical assembly including the at least one light wave source is rotatable or pivotable synchronously. For example, the beam path may be mutually used for transmitting a light wave by the light wave source and for receiving a reflected light wave by the optical assembly. The rotation or pivoting may alternatively also be carried out by variable deflection of the light wave. For example, a deflection mirror may rotate or pivot. This embodiment is also implementable in a technically simple way.

Exemplary embodiments of the present invention are subsequently explained in greater detail by way of highly simplified schematic depictions.

In the figures, identical configuration elements have identical reference numerals in each case.

DETAILED DESCRIPTION

Figure 1:
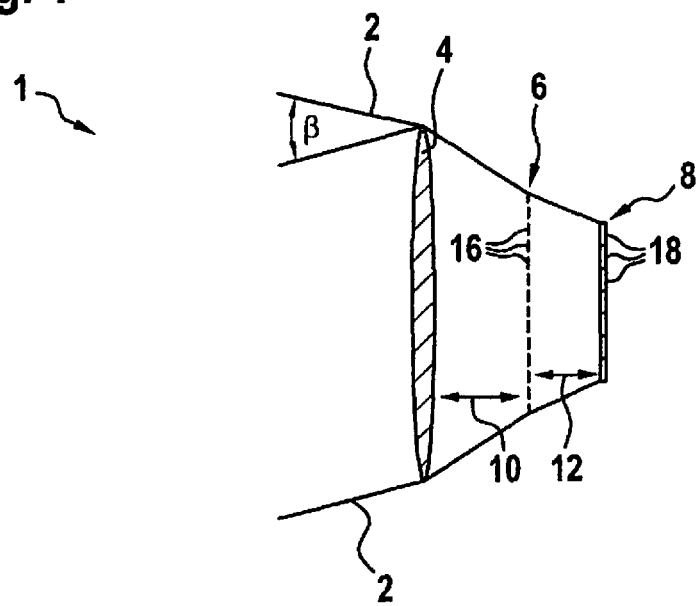
FIG. 1 shows a schematic depiction of an optical assembly according to a first exemplary embodiment.

FIG. 1 shows a schematic depiction of an optical assembly 1 according to a first exemplary embodiment. In particular, a beam path 2 is indicated in the edge areas of optical assembly 1, which defines an incidence angle $\beta/2$. Thus, an incoming light wave at an incidence angle $\beta/2$ may be deflected or focused via a receiving optical system 4 onto a diffractive optical element 6 and thereafter onto a detector 8. Receiving optical system 4 is configured here in the form of a convex converging lens. Alternatively, receiving optical system 4 may also include a group or a system made up of convex and/or concave lenses, which, in addition to bundling the light wave also counteract imaging errors, for example, aberrations or astigmatism. Diffractive optical element 6 according to the exemplary embodiment is a hologram or a holographic optical element 6, which is situated at a distance 10 from receiving optical system 4. Distance 10 is selected in such a way that diffractive optical element 6 is completely illuminated or lit by an incoming light wave. Diffractive optical element 6 includes focusing as an optical function and diffracts the incoming light wave in such a way that it strikes detector 8. Detector 8 has a rectangular shape and is made up of a plurality of detector cells 18. Hologram 6 includes a plurality of hologram pixels 16, in which the optical function is stored. The optical function is hereby stored in each hologram pixel 16 and is identical in each hologram pixel 16 in this exemplary embodiment. Alternatively, the optical function may vary locally along an extension of hologram 6. Thus, for example, the incident light wave may, for example, be deflected locally in different directions or focused with different focal lengths, depending on the optical function of illuminated hologram pixel 16. Distances 10, 12 between receiving optical system 4, hologram 6, and detector 8, and also hologram pixels 16 and the size of detector cells 18 are adapted to each other and to a wavelength of the light wave. A detector cell 18 is assigned here to each hologram pixel 16 and the number of detector cells 18 corresponds to the n×n hologram pixels 16. A reduction of a surface of detector 8 by interposing a hologram 6 arises from the relationship:

$$\text{size\_hologram pixel} = n * \text{size detector cell}$$

A reduction of the surface of detector 8 arises through the use of hologram 6:

$$\text{surface\_det}_{new} = \text{surface\_det}_{old}/n^2$$

The size of detector cells 18 may hereby be increased, so that deviations from the defined wavelength of the light wave, for example due to wavelength shifts caused by temperature changes, or charge deviations or manufacturing tolerances, may be considered.

Figure 2:
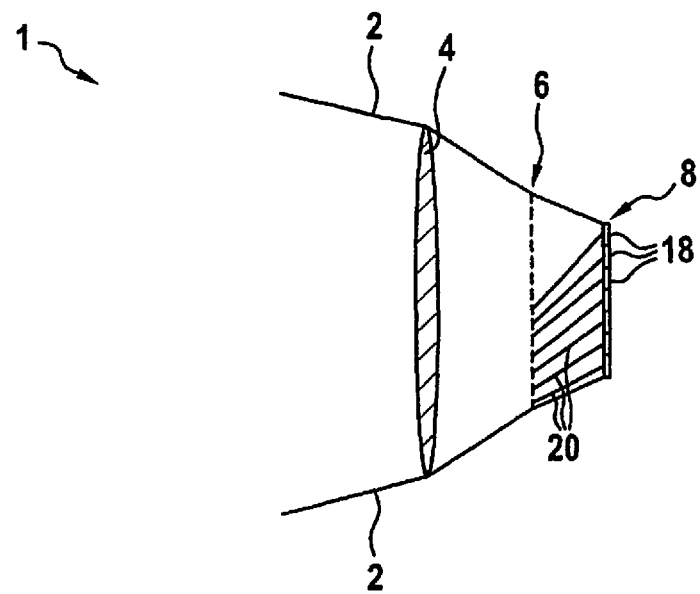
FIG. 2 shows a schematic depiction of an optical assembly according to a second exemplary embodiment.

FIG. 2 shows a schematic depiction of an optical assembly 1 according to a second exemplary embodiment. In contrast to the first exemplary embodiment of optical assembly 1, hologram 6 has locally varying optical functions in this case. Hologram 6 is divided into two areas, each area of which directs the incoming light wave onto the entire surface of detector 8. Thus, detector cells 18 are illuminated with a doubled light intensity, so that detector cells 8 may be configured to be smaller. Thus, the surface of detector 18 may be reduced in size. For the sake of clarity, only deflected beams 20 from one half of hologram 6 are depicted.

With poorer signal-to-noise behavior, this configuration is particularly suited for applications in which interruptions are unproblematic. Examples for this are indoor applications or applications with minimal range. Alternatively, variants are also possible, in which three or more hologram pixels 16 illuminate one detector cell 18.

Figure 3:
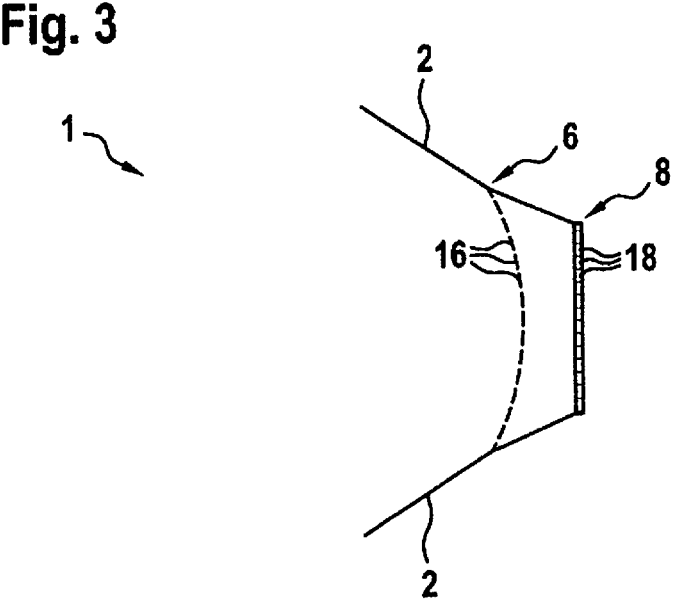
FIG. 3 shows a schematic depiction of an optical assembly according to a third exemplary embodiment.

FIG. 3 shows a schematic depiction of an optical assembly 1 according to a third exemplary embodiment. In contrast to the first and second exemplary embodiments, no receiving optical system 4 is used in this case. Instead, hologram 6 or diffractive optical element 6 has a parabolic curvature and is thus not configured in the shape of a flat surface, unlike the previous exemplary embodiments. The optical function of hologram pixels 16 varies along the local extension of hologram 6, so that the at least one light wave is focused onto detector 8.

Figure 4:
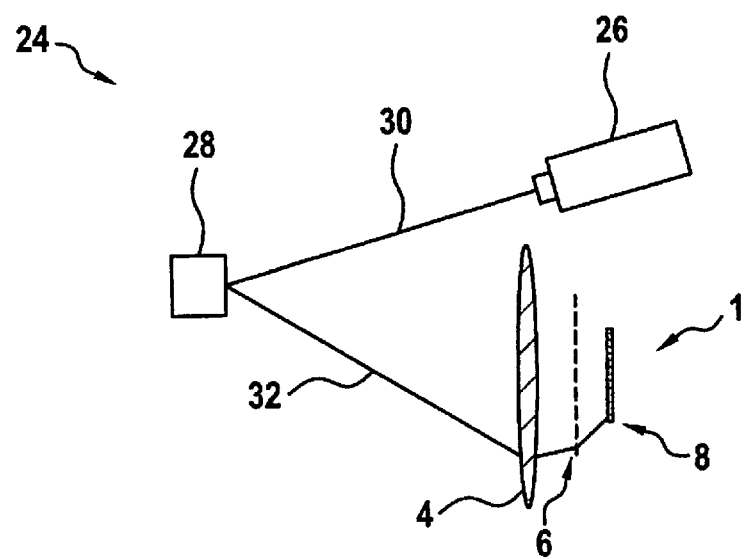
FIG. 4 shows a schematic depiction of a LIDAR device including an optical assembly according to the first exemplary embodiment.

In FIG. 4, a schematic depiction of a LIDAR device 24 is shown including an optical assembly 1 according to the first exemplary embodiment. LIDAR device 24 includes a light wave source 26, which in this case is a laser to emit coherent light waves. Entire device 24 is configured to be pivotable according to the exemplary embodiment, whereby a certain angle to objects 28 and their speed may be scanned. To determine the speed, a change of a propagation time measurement over the distance to object 28 is carried out and the speed is calculated therefrom. In particular, optical assembly 1 functions as a receiving assembly to receive reflected light waves 32. In particular, if a light wave 30 generated by laser 26 strikes an object 28 or obstacle 28, then light wave 30 is partially reflected. Reflected light wave 32 may thus arrive in receiving optical system 4. Receiving optical system 4 focuses light wave 32 onto hologram 6. Hologram 6 may in turn correct optical errors and forward light wave 32 onto the detector so that reflected light wave 32 may be optimally detected. The distance may be ascertained from the difference in the propagation times of generated light wave 30 and reflected light wave 32, and the speed and the contour of object 28 may also be ascertained from a plurality of measurements.

What is claimed is:

1. An optical assembly for receiving light waves, comprising:
   a detector;
   a receiving optical system to focus at least one incoming light wave towards the detector; and
   at least one diffractive optical element with a planar extension, that is situated between the receiving optical system and the detector, and that has a surface with a surface structure with at least one optical function including diffraction;
   wherein:
      light of the at least one incoming light wave is concentrated by the diffraction, thereby bundling the light so as to reduce a surface area that the light covers; and
      the at least one diffractive optical element is arranged so that the bundled light of the at least one incoming light wave is directed onto a surface of the detector for the detector to thereby detect the at least one light wave; and
   wherein either or both of the following features (1) and (2):
      (1) the diffractive optical element is structured so that light wave deflection by one area of the diffractive optical element occurs more strongly than light wave deflection by another area of the diffractive optical element; and
      (2) (a) the detector includes a plurality of detector cells, (b) the diffractive optical element includes a plurality of discrete pixels, (c) the diffractive optical element and the detector are arranged so that each of the detector cells of the detector receives light from a respective subset of the pixels of the diffractive optical element, (d) each of the subsets includes at least two respective pixels of the diffractive optical element, (e) the diffractive optical element includes a first area of the pixels and a second area of the pixels that is separate from the first area of the pixels, (f) each of the pixels of the first area focuses light to a different respective one of the detector cells than each other one of the pixels of the first area, (g) each of the pixels of the second area focuses light to a different respective one of the detector cells than each other one of the pixels of the second area, and (h) the diffractive element is arranged so that a combination of light from the pixels of the first area is focused onto all of the detector cells and so that a combination of light from the pixels of the second area is also focused onto all of the detector cells.

2. The optical assembly of claim 1, wherein the diffractive optical element includes a hologram to deflect or focus a light wave.

3. The optical assembly of claim 1, wherein the diffractive optical element includes a volume hologram for deflecting or focusing a light wave.

4. The optical assembly of claim 1, wherein the detector includes a plurality of detector cells which are distributed uniformly or non-uniformly along a surface of the detector.

5. The optical assembly of claim 1, wherein the receiving optical system focuses incoming light waves via at least one lens element onto the at least one diffractive optical element.

6. The optical assembly of claim 1, wherein the diffractive optical element includes an even or uneven surface with a surface structure along the surface.

7. The optical assembly of claim 1, wherein the optical function varies along the surface of the diffractive optical element.

8. The optical assembly of claim 1, wherein the surface of the diffractive optical element has at least two superimposed optical functions.

9. The optical assembly of claim 1, wherein the diffractive optical element includes an optical function which is dependent on a wavelength of the at least one light wave.

10. The optical assembly of claim 1, wherein the detector includes the plurality of detector cells, the diffractive optical element includes the plurality of discrete pixels, the diffractive optical element and the detector are arranged so that each of the detector cells of the detector receives light from the respective subset of the pixels of the diffractive optical element, and each of the subsets includes at least two respective pixels of the diffractive optical element.

11. A LIDAR device for transmitting and receiving at least one light wave, comprising:
   at least one rotatable or pivotable light wave source; and
   an optical assembly for receiving light waves, the optical assembly including:
      a detector;
      a receiving optical system to focus at least one incoming light wave towards the detector; and
      at least one diffractive optical element with a planar extension, that is situated between the receiving optical system and the detector, and that has a surface with a surface structure with at least one optical function including diffraction;
   wherein:
      light of the at least one incoming light wave is concentrated by the diffraction, thereby bundling the light so as to reduce a surface area that the light covers; and
      the at least one diffractive optical element is arranged so that the bundled light of the at least one incoming light wave is directed onto a surface of the detector for the detector to thereby detect the at least one light wave; and
   wherein either or both of the following features (1) and (2):
      (1) the diffractive optical element is structured so that light wave deflection by one area of the diffractive optical element occurs more strongly than light wave deflection by another area of the diffractive optical element; and
      (2) (a) the detector includes a plurality of detector cells, (b) the diffractive optical element includes a plurality of discrete pixels, (c) the diffractive optical element and the detector are arranged so that each of the detector cells of the detector receives light from a respective subset of the pixels of the diffractive optical element, (d) each of the subsets includes at least two respective pixels of the diffractive optical element, (e) the diffractive optical element includes a first area of the pixels and a second area of the pixels that is separate from the first area of the pixels, (f) each of the pixels of the first area focuses light to a different respective one of the detector cells than each other one of the pixels of the first area, (g) each of the pixels of the second area focuses light to a different respective one of the detector cells than each other one of the pixels of the second area, and (h) the diffractive element is arranged so that a combination of light from the pixels of the first area is focused onto all of the detector cells and so that a combination of light from the pixels of the second area is also focused onto all of the detector cells.

12. The LIDAR device of claim 11, wherein the LIDAR device is configured to operate the at least one light wave source to rotate or pivot synchronously with operation of the optical assembly.

13. The optical assembly of claim 1, wherein the diffractive optical element is structured so that the light wave deflection by the one area of the diffractive optical element occurs more strongly than the light wave deflection by the other area of the diffractive optical element.

14. The optical assembly of claim 13, wherein the one area is an edge area of the diffractive optical element, and the other area is a central area of the diffractive optical element.

15. The optical assembly of claim 10, wherein:
   the diffractive optical element includes the first area of the pixels and the second area of the pixels that is separate from the first area;
   each of the pixels of the first area focuses light to the different respective one of the detector cells than each other one of the pixels of the first area;
   each of the pixels of the second area focuses light to the different respective one of the detector cells than each other one of the pixels of the second area; and
   the diffractive optical element is arranged so that the combination of light from the pixels of the first area is focused onto all of the detector cells and so that the combination of light from the pixels of the second area is also focused onto all of the detector cells.

* * * * *